No. 628,866. Patented July 11, 1899.
F. M. STARRETT.
FRUIT GRADER, DIPPER, AND SPREADER.
(Application filed Oct. 29, 1898.)
(No Model.) 2 Sheets—Sheet 2.
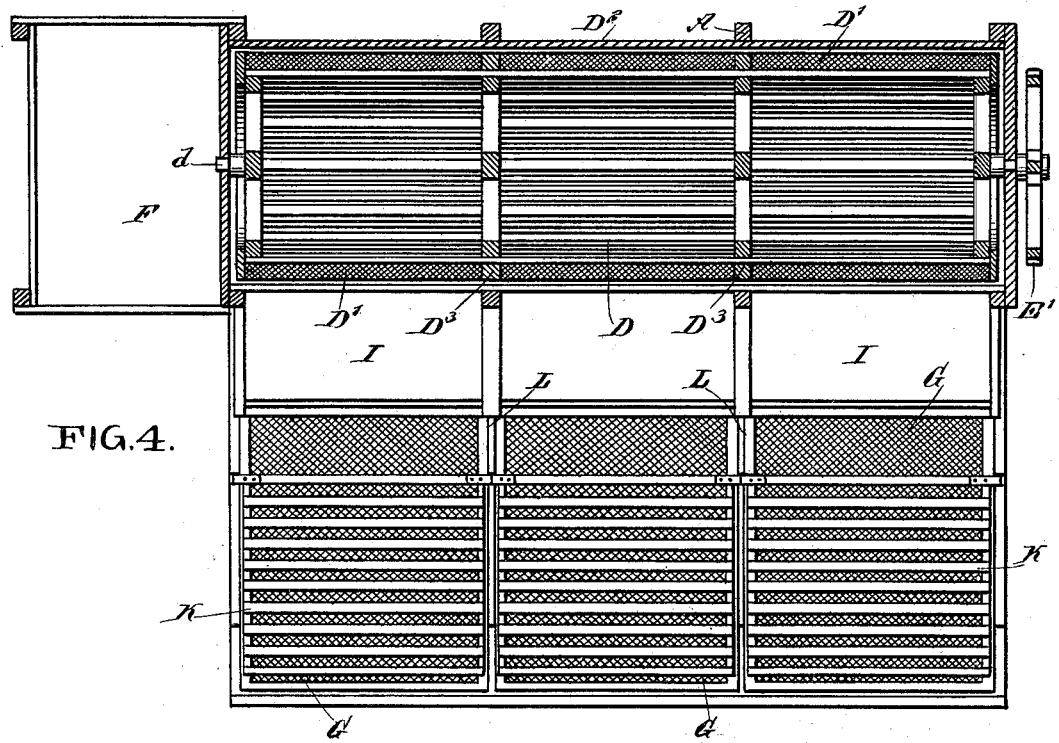
FIG. 4.
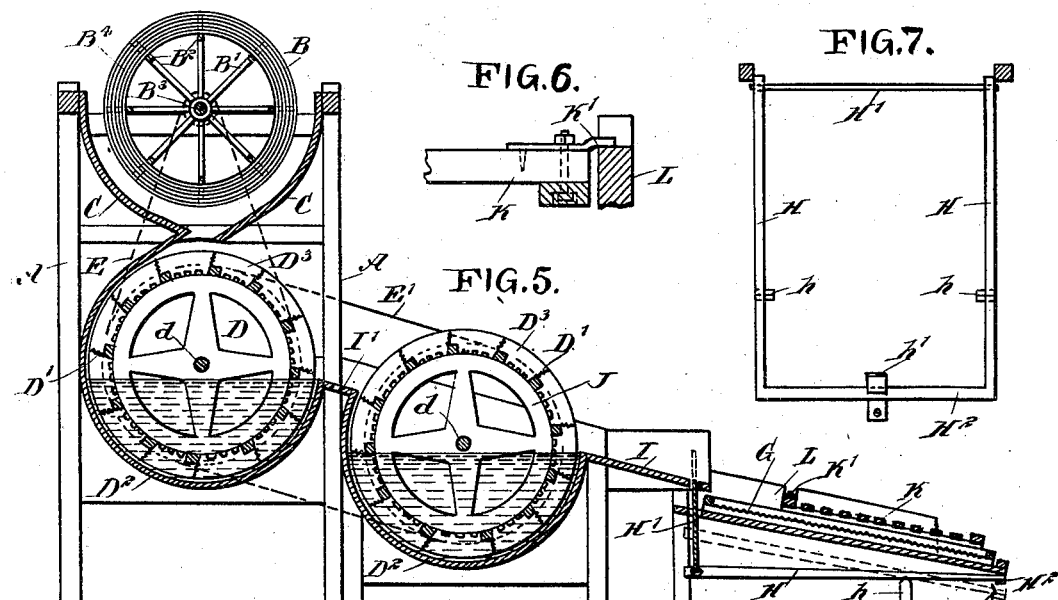
FIG. 6. FIG. 7. FIG. 5. FIG. 8.
WITNESSES:
Donn Twitchell
H. L. Reynolds.
INVENTOR
F. M. Starrett
BY
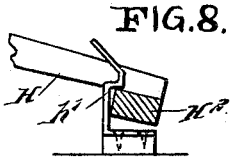
ATTORNEYS.

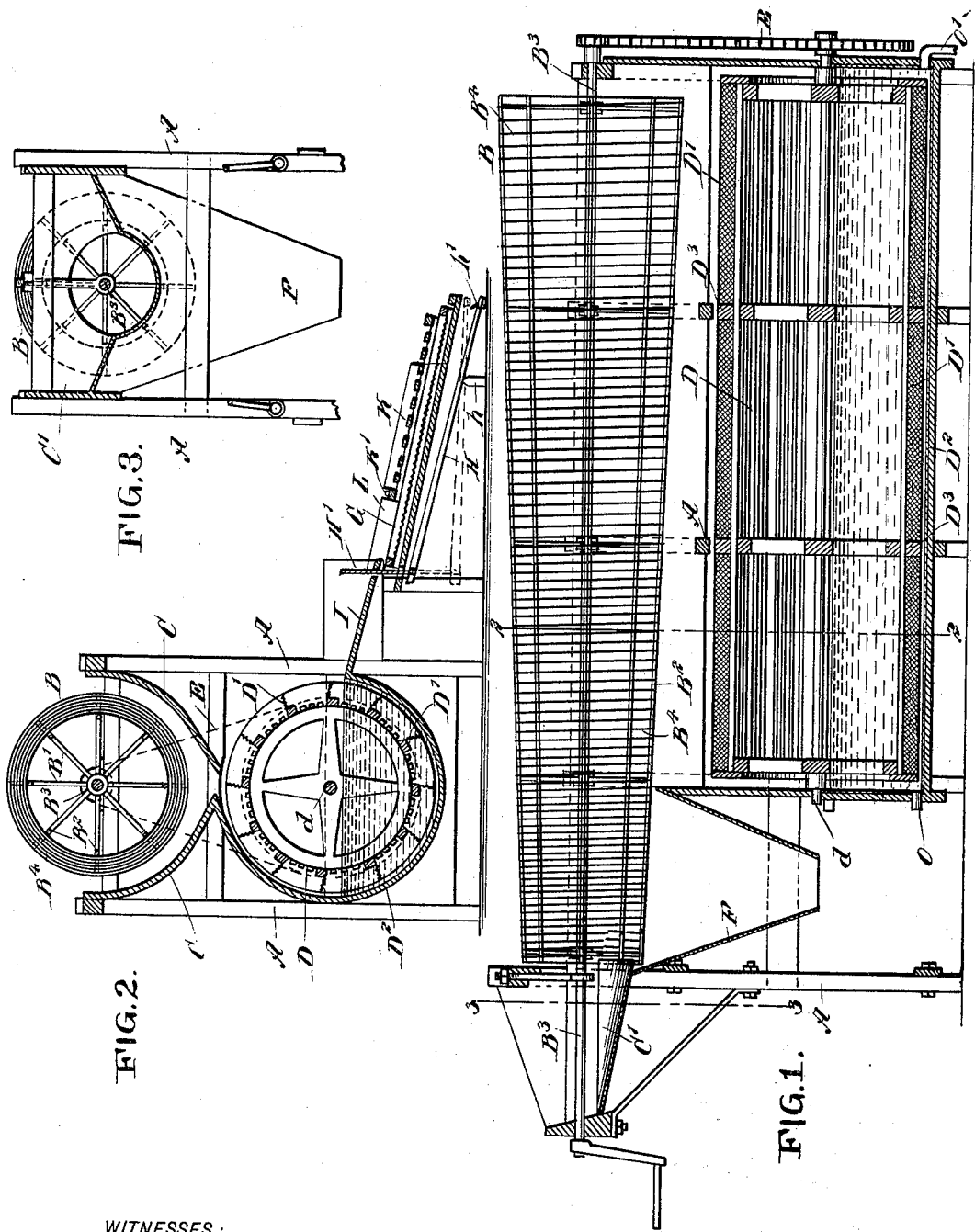

UNITED STATES PATENT OFFICE.

FERDINAND M. STARRETT, OF SILVERTON, OREGON.

FRUIT GRADER, DIPPER, AND SPREADER.

SPECIFICATION forming part of Letters Patent No. 628,866, dated July 11, 1899.

Application filed October 29, 1898. Serial No. 694,913. (No model.)

*To all whom it may concern:*

Be it known that I, FERDINAND M. STARRETT, of Silverton, in the county of Marion and State of Oregon, have invented a new and Improved Fruit Grader, Dipper, and Spreader, of which the following is a full, clear, and exact description.

My invention relates to an improvement in devices used in preparing fruits, such as prunes, for drying, and comprises the novel features hereinafter described and claimed.

Reference is to be had to the accompanying drawings, forming a part of this specification, in which similar characters of reference indicate corresponding parts in all the figures.

Figure 1 is a sectional elevation taken through the grading and dipping cylinders. Fig. 2 is a sectional elevation taken upon the line 2 2 of Fig. 1. Fig. 3 is a partial sectional elevation taken upon the line 3 3 of Fig. 1. Fig. 4 is a plan showing the dipping-cylinder in section. Fig. 5 is a sectional end elevation showing a machine having two dipping-cylinders. Fig. 6 is a detail view showing the construction of the frame which covers the trays while they are being filled, and Fig. 7 is a plan view of the lever or pivoted frame by which the gate is controlled.

While my device has been designed particularly for use in connection with the preparation of prunes for drying, it is obvious that it may be used in connection with any other kind of fruit which requires a similar preparation. In preparing prunes for drying it is desirable, if not necessary, that the fruit should be dipped before being placed upon the drying-trays. This treatment varies somewhat, in some cases consisting simply in dipping the fruit into scalding-hot water and in other cases consisting in first dipping the fruit into lye-water and then dipping the fruit into clear water. The object of this treatment is to check the skin of the fruit, so that it will dry more rapidly, and at the same time to cleanse the outer surface of the fruit.

Prior to dipping the fruit it is desirable that the fruit should be graded or separated into different sizes, so that the drying shall be uniform and the different grades of fruit be properly separated for market. All of these operations, as well as the spreading of the fruit upon the trays, are accomplished by my device.

The fruit as picked is first placed within a hopper C', which has its lower surface sloping, so as to discharge the fruit into the smaller end of a conical grading-cylinder B. This cylinder B is mounted to turn upon a central shaft B³, which is supported in suitable bearings upon the framework A of the device. This cylinder, as herein shown, consists of radial spokes B', which support longitudinal ribs or bars B², upon which is spirally wound a wire B⁴. This wire is wound upon the framework, so that the spacing between consecutive coils of the wire gradually increases from the smaller to the larger end. A single wire may be used for this purpose or two or more wires, making the pitch of the spiral double or triple instead of single. As a result of this the fruit of marketable size will not pass between the wires at the smaller end of the grader, but will continue down the length of the grader. The dirt, leaves, and similar trash which is liable to become mixed with the fruit during picking will pass between the coils of the wire at the upper or smaller end of the grader and be discharged into the funnel or receptacle F. The smaller prunes will first be discharged from between the wires of the grader, and the larger ones will continue to the larger end of the grader, thus sorting the prunes according to size. The prunes when discharged from the grader fall upon the inclined aprons C, which conduct them to the dipping-cylinder D. This dipping-cylinder consists of a skeleton frame having its periphery formed of slats or any other shape, so as to permit the free discharge of water through the same. This cylinder is provided with a series of longitudinal projecting wings D', adapted to engage the fruit and carry it down beneath the water and finally to elevate it above the water. The dipping-cylinder is also provided with circumferential projections D³, which keep the various grades separated.

The cylinder is mounted to turn upon a central axis $d$ and within a tank or trough D², which closely surrounds the cylinder, so that the fruit cannot pass between the outer edges of the wings D' and the trough, and the lower edge of the trough rises to near the center of the cylinder. This trough is filled either with hot water or lye-water, depending upon the treatment to be given the fruit. When hot water is used for treating the fruit, a single dipping-cylinder is all that is necessary. When lye-water or any other solution which will require rinsing is used, two cylinders are used, the first containing the lye-water and the second the rinsing-water, the fruit as discharged from the first cylinder being received by the second cylinder, as shown in Fig. 5, in which said second or rinsing cylinder is indicated by J. In this case the two cylinders are exactly alike in construction. The wings D' upon the dipping-cylinders are preferably formed of wire-netting of such mesh as to prevent the fruit from passing through the meshes and to permit the water to flow freely through the same. They are also given a slight backward inclination, as clearly shown in the sectional elevations, so as to permit a free discharge of the fruit therefrom. As the fruit is elevated above the water in the dipping-trough it rolls off of the wings D' upon an apron I, which is preferably perforated or otherwise constructed so as to permit the water drained from the fruit to readily pass through the same. This latter feature is, however, not essential. When two dipping-cylinders are employed, as shown in Fig. 5, a second apron I' is placed between the two cylinders. This apron should be perforated, so as to prevent as much of the lye as possible from entering the rinsing-trough $D^2$.

The grading-cylinder B is connected with the dipping-cylinder D by means of a sprocket-chain E, which passes over sprocket-wheels mounted upon the shafts of the two cylinders. The two dipping-cylinders are also connected in a similar manner by a sprocket-chain E', which passes over sprocket-wheels upon the two cylinders.

A support for the drying-trays is provided immediately beneath the apron I. The apron I is made of such inclination that the fruit will readily roll down the same and upon the trays, the trays being similarly inclined, so that the fruit as received thereon will roll to the lower edge. These trays G are formed of any suitable material, but preferably of woven wire, so as to permit a free circulation of air through the trays while the fruit is being dried. The trays G when in position are covered by a cover K, which, as herein shown, is formed of slats, but which may be formed in any suitable manner. This cover is raised above the bottom of the tray a distance corresponding with the depth of fruit desired upon the trays. The fruit as it rolls down the inclined surface of the trays will gradually fill the space between the trays and the cover K, thus making an even layer of fruit upon the trays, so that the fruit will dry evenly. The covers K may be made so as to be readily removed for the purpose of removing the trays G. These covers are preferably provided with projecting bars K', located at their ends and adapted to engage the partitions L between the trays, and thus to be supported above the trays in such a manner that they may be readily removed and their supports not interfere with the removal of the trays.

A gate H' is provided for holding back the fruit while one tray is being removed and another substituted therefor. This gate consists of a board mounted in suitable guides, so as to have vertical movement, and located at the lower edge of the inclined apron or table I. The gate is supported upon one end of levers H, pivoted at $h$ beneath the trays, and the opposite ends of the levers H are connected by a cross-bar $H^2$, which projects far enough so as to be readily engaged by the aprons and be depressed so as to elevate the gate H'. A spring-catch $h'$ is provided for engaging the cross-bar $H^2$ and holding that end down, and thus to hold the gate elevated while the tray is being removed and another one substituted therefor. The cross-bar $H^2$ and the spring-catch $h'$ may be engaged and operated by the foot. The gate H' thus holds the fruit upon the table I until an empty tray can be substituted for the full one. When the gate is dropped, the fruit which has collected will roll down into the empty tray.

The troughs $D^2$ are provided at opposite ends, respectively, with an inlet-opening O and an outlet O', so that a flow of the water or dipping liquid may be provided through the trough when necessary.

The operation of my device is entirely automatic, it being necessary only to pour the fruit into the hopper C' and to provide power for rotating the various cylinders. The fruit will pass from the grading-cylinder to the first dipping-cylinder and thence to the second dipping-cylinder, when two cylinders are used, and then to the trays, and the regulation of the depth of fruit upon the trays is also accomplished automatically by means of the cover K.

Having thus fully described my invention, I claim as new and desire to secure by Letters Patent—

1. In a device of the character described an inclined support, trays on the support, and a cover for the tray supported at a distance above the trays corresponding with the depth of fruit desired upon the tray, substantially as described.

2. In a device of the character described, an inclined support, trays on the support, an inclined feeding-apron receiving the fruit and discharging upon the upper side of the tray, a gate adapted to prevent said discharge when desired, and a cover supported at a short distance above the trays and limiting the depth of fruit thereon, substantially as described.

3. In a device of the character described an inclined support, trays on the support, an inclined feeding-apron receiving the fruit and discharging upon the upper side of the trays, a gate consisting of a vertical board adapted to be raised or lowered to prevent discharge of the fruit, levers connected with the gate and extending beneath the trays, a catch for holding the gate raised, and a cover supported at a short distance above the tray and limiting the depth of fruit thereon, substantially as described.

4. A fruit-dipping device, comprising a cylinder mounted to turn on its axis and having longitudinally-extending and apertured wings, a tank closely surrounding the lower part of said cylinder, means for feeding fruit onto the top of the cylinder, inclined trays receiving the fruit as discharged from the other side of the cylinder, and covers above the trays limiting the depth of fruit thereon, substantially as described.

5. A machine for preparing fruit for drying, comprising a grading-cylinder, a dipping-cylinder mounted to revolve below the grading-cylinder and having longitudinally-extending and apertured wings, a tank or trough closely surrounding the dipping-cylinder, the dipping-cylinder receiving upon one side the fruit as discharged from the hopper and discharging it at the other side, and inclined supports for drying-trays placed to receive the discharge from the dipping-cylinder, substantially as described.

6. A machine for preparing fruit for drying, comprising a grading-cylinder, a dipping-cylinder and trough located below the grader and receiving the fruit upon one side and discharging it upon the other, the said dipping-cylinder having longitudinally-extending and apertured wings and circumferential projections, rotative connection between the grading and dipping cylinders, and a tray-support placed to receive the discharge from the dipping-cylinder, substantially as described.

7. A machine of the character described, comprising a grading-cylinder, a tank below the grading-cylinder, and a dipping-cylinder mounted in the tank and provided with longitudinally-extending wings, said cylinder being formed into sections to keep the various grades separated, substantially as described.

8. A machine of the character described, comprising a grading-cylinder, a tank below the grading-cylinder, and a dipping-cylinder mounted in the tank and receiving the material from the grading-cylinder, said dipping-cylinder being of open-work and provided with circumferential projections forming it into sections and with longitudinally-extending and apertured wings in each section, substantially as described.

9. In a machine of the character described, the combination with a support, and trays on the support and having partitions between them, of covers for the trays provided with projections resting upon the partitions and supporting them above the trays, substantially as described.

FERDINAND M. STARRETT.

Witnesses:
LOUIS J. ADAMS,
M. J. ADAMS.